United States Patent [19]

Kobayashi

[11] Patent Number: 5,153,273

[45] Date of Patent: * Oct. 6, 1992

[54] AMPHIPHILIC MACROMONOMER HAVING POLYETHYLENEIMINE DERIVATIVE CHAIN AND PRODUCTION PROCESS THEREOF, AS WELL AS GRAFT POLYMER HAVING AMPHIPHILIC POLYETHYLENEIMINE DERIVATIVE CHAIN AS A GRAFT CHAIN AND PRODUCTION PROCESS THEREOF

[76] Inventor: Shiro Kobayashi, 1-1-302, Kawauchi Juutaku, Kawauchi Mubanchi, Sendai-shi, Miyagi 980, Japan

[ * ] Notice: The portion of the term of this patent subsequent to Mar. 20, 2007 has been disclaimed.

[21] Appl. No.: 501,897

[22] Filed: Mar. 30, 1990

[30] Foreign Application Priority Data

Apr. 24, 1989 [JP] Japan ................... 1-101726

[51] Int. Cl.[5] ............................. C08G 73/02
[52] U.S. Cl. .................... 525/412; 525/417; 525/925; 526/304; 526/306
[58] Field of Search .......... 525/412, 411, 417, 925; 526/304, 306

[56] References Cited

U.S. PATENT DOCUMENTS 4,910,268 3/1990 Kobayashi .................. 525/412

FOREIGN PATENT DOCUMENTS 0136844 10/1981 Japan .................... 525/411

Primary Examiner—James J. Seidleck
Assistant Examiner—W. R. H. Clark
Attorney, Agent, or Firm—Armstrong & Kubovcik

[57] ABSTRACT

A (meth)acrylic or styryl macromonomer having a amphiphilic polyethyleneimine derivative chain represented by the general formula:

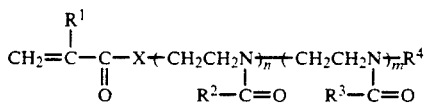

or

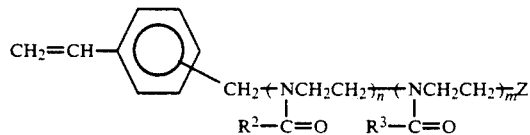

and a production process for the monomer, as well as a graft polymer having a amphiphilic polyethyleneimine derivative as the graft chain represented by the general formula:

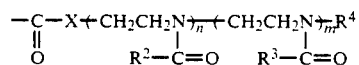

or

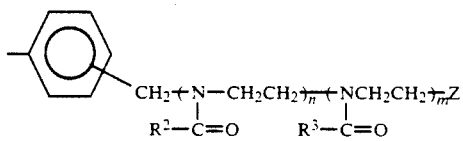

and a production process for the graft copolymer.

1 Claim, No Drawings

AMPHIPHILIC MACROMONOMER HAVING POLYETHYLENEIMINE DERIVATIVE CHAIN AND PRODUCTION PROCESS THEREOF, AS WELL AS GRAFT POLYMER HAVING AMPHIPHILIC POLYETHYLENEIMINE DERIVATIVE CHAIN AS A GRAFT CHAIN AND PRODUCTION PROCESS THEREOF

BACKGROUND OF THE INVENTION

1. Field of the Invention

The present invention concerns functional polymers that can be used as a non-ionic polymeric surface active agent, surface improver, dispersant, solubilizing agent, antistatic agent, polymeric dielectric agent, adhesive, binder or material adaptable to living body, etc. obtained by copolymerization with various vinyl monomers, such as acryl monomer, or styryl monomer or graft polymerization to various polymers, as well as a novel monomer useful for the production thereof.

2. Description of the Prior Art

It has been known that poly(N-formylethyleneimine) or poly(N-acylethyleneimine) can be synthesized by cationic polymerization of 2-oxazoline monomer as shown by the formula (i) below (S. Kobayashi, et. al., Encyclo. Poly. Sci. & Eng. Vol. 4 2nd Ed. 525 (1986)):

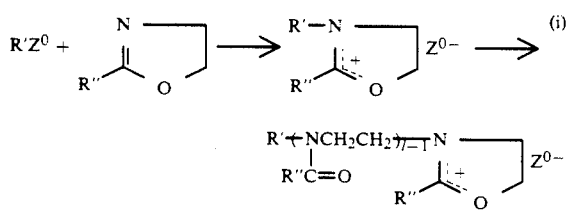

where R' represents H or a lower alkyl group, R" represents H or $C_1$–$C_{18}$ an alkyl or aryl group, $Z^0$ represents an electron attracting group such as Br, I and $RSO_3$, R represents a monovalent organic group and l represents a positive integer.

It has also been known that living growing terminals of such a polymer can be deactivated to terminate polymerization by reaction with water, ammonia or a nucleophilic reagent such as a primary amine as shown by (ii), (iii) or (iv) respectively (Kobayashi, et. al. Preprint, p 417 for The 53rd Annual Meeting of Chemical Society of Japan (1986)).

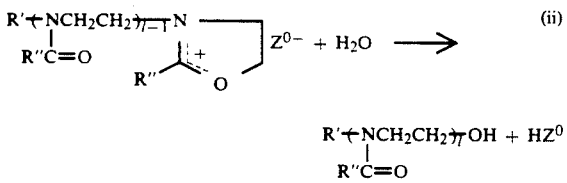

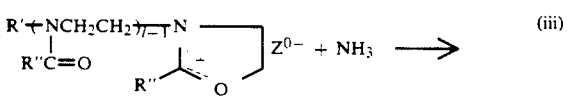

where R', R", $Z^0$ and l have the same meanings as defined in the formula (i)

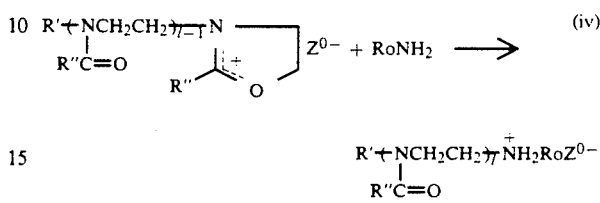

where R', R", $Z^0$ and l have the same meanings as defined in the formula (i) and $R_0$ represents a monovalent organic group.

The present inventor has succeeded in synthesizing a novel macromonomer based on the improvement of such technique and synthesizing a novel graft polymer by using such a macromonomer and has already filed a patent application regarding this novel technique.

By the way, the novel graft polymer was a high molecular weight material having a special surface activity and can not be dissolved into solvents except within a restricted narrow range. Although it was possible to vary the polarity, by changing the type of the substituent acyl group on the polyethyleneimine chain, and synthesize a polymer that is soluble in a polar solvent, such as water, and a polymer soluble in a non-polar solvent, a polymer soluble in each of a plurality of kinds of solvents was not obtained.

In view of the above, the present inventor has made an earnest study with an aim of moderating the limit for the solvent selectivity of a special surface active polymer having the polyethyleneimine derivative chain as the graft chain and, as a result, has accomplished the present invention based on the finding that a novel acryl, methacryl and styryl type macromonomer having an amphiphilic polyethyleneimine derivative chain can be obtained by block copolymerizing a hydrophilic and a hydrophobic 2-oxazoline to introduce vinyl groups to the terminal ends, as well as that a novel graft copolymer, having specific functional groups and can be expected to have various application uses, is obtained by using such a novel amphiphilic macromonomer.

SUMMARY OF THE INVENTION

The foregoing object of the present invention can be attained by a (meth)acrylic or styryl type macromonomer having an amphiphilic polyethyleneimine derivative chain represented by the general formula:

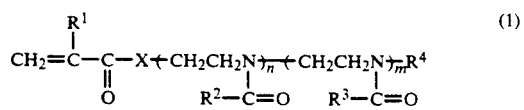

where $R^1$ represents H or $CH_3$, $R^2$ represents H or a (substituted) alkyl or aryl group, $R^3$ represents H or a (substituted) alkyl or aryl group which is different from $R^2$, $R^4$ represents H or a (substituted) alkyl, X represents O or $NR^5$, $R^5$ represents H or an alkyl or aryl group and each of n and m represents an integer of 1 to 1000, as well as represented by the general formula:

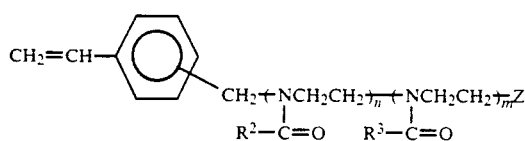

where $R^2$ represents H or a (substituted) alkyl or aryl group, $R^3$ represents H or a (substituted) alkyl or aryl group which is different from $R^2$, Z represents an electron attracting group such as OH, Br, I and $RSO_3$, each of n and m represents an integer of 1 to 1000.

The novel monomer shown by the above-mentioned general formula (1) can be produced by reacting a compound represented by the general formula:

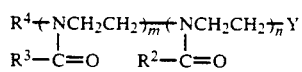

where $R^2$ represents H or a (substituted) alkyl or aryl group, $R^3$ represents H or a (substituted) alkyl or aryl group which is different from $R^2$, $R^4$ represents H or a (substituted) alkyl group, Y represents OH or $NHR^5$, $R^5$ represents H or an alkyl or aryl group and each of n and m represents an integer of 1 to 1000, with a (meth)acrylic acid derivative thereof under the presence of a base.

Alkyl group for $R^2$, $R^3$, $R^4$ and $R^5$ is usually $C_1$-$C_{18}$ alkyl group, preferably, $C_1$-$C_{12}$ alkyl group. The substituted alkyl group for $R^2$ and $R^3$ is benzyl, alkoxyalkyl, halogenated alkyl, fluorine-containing alkyl, etc. As the substituent for $R^4$, there can be mentioned benzyl or methoxymethyl. Further, the alkyl or aryl group for $R^5$ can be mentioned methyl, butyl, benzyl or phenyl.

The value for each of n and m is preferably from 3 to 500.

The compound represented by the formula (3) can be prepared by living copolymerization of two kinds of 2-oxazoline compounds by using a cationic polymerization initiator, for example, p-toluenesulfonate, benzenesulfonate, methanesulfonate, trifluoromethanesulfonate, alkyl iodide, alkyl bromide, alkyl chloride, benzyl bromide, benzyl chloride and dimethyl sulfate and then reacting the living growing terminal thereof with a nucleophilic reagent such as water, ammonia or primary amine. In this case, the value for n and m can be controlled by varying the molar ratio of two kinds of 2-oxazoline compounds as the starting material and the initiator. Further, upon reacting the living growing terminal and water, it is possible to use a method of hydrolyzing the growing terminal end by heating under the coexistence of an alkaline reagent such as sodium carbonate.

The macromonomer according to the present invention of the formula (1) can be obtained by reacting the compound of the formula (3) thus obtained under the presence of a base, for example, triethylamine, tributylamine or pyridine, together with (meth)acrylic acid or a (meth)acrylic acid halide such as acryloyl chloride or methacryloyl chloride or a methacrylic acid derivative such as a methacrylate and methacrylic acid anhydride at a temperature from $-20°$ C. to $150°$ C., preferably, from $0°$ C. to $120°$ C.

Further, the amphiphilic acrylic macromonomer represented by the general formula (1) can be obtained by the living copolymerization of two kinds of 2-oxazoline compounds represented by the general formula:

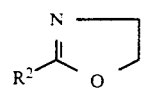

where $R^2$ represents H or a (substituted) alkyl or aryl group and the general formula:

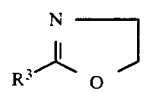

where $R^3$ represents H or a (substituted) alkyl or aryl group which is different from $R^2$, by using a cationic polymerization initiator, and reacting the living growing terminals of the thus resultant polymer chain directly with a salt of (meth)acrylic acid of a metal such as sodium, potassium, silver, copper or calcium, a mixture of (meth)acrylic acid and a base such as butylamine, propylamine, trimethylamine, triethylamine and pyridine, or an ammonium salt formed from the mixture, sulfonium salt such as trisdimethylsulfonium methacrylate, an ester compound of sulfonium salt with metal such as silicon, tin and titanium at a temperture from $-20°$ C. to $150°$ C., preferably, from $0°$ C. to $120°$ C.

The novel monomer represented by the general formula (2) can be produced by living block copolymerization of two kinds of 2-oxazoline compounds represented by the general formula:

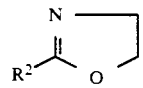

where $R^2$ represents H or a (substituted) alkyl or aryl group and the general formula:

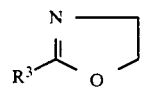

where $R^3$ represents H or a (substituted) alkyl or aryl group which is different from $R^2$, using a styryl type compound represented by the general formula:

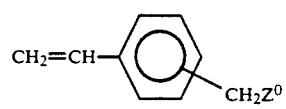

where $Z^0$ represents an electron attracting group such as Br, I or $RSO_3$, as a cationic polymerization initiator.

The alkyl group for $R^2$ and $R^3$ is usually $C_1$-$C_{18}$ and, preferably, $C_1$-$C_{12}$ alkyl group. Further, the alkyl substituent for $R^2$ and $R^3$, there can be mentioned benzyl, alkoxyalkyl, halogenated alkyl or fluoro-containing alkyl.

The value for n and m can be controlled by varying the molar ratio of the two kinds of 2-oxazoline compounds as the starting material and the styryl type initiator.

Further in the present invention, a novel graft polymer having a amphiphilic polyethyleneimine derivative chain represented by the general formula:

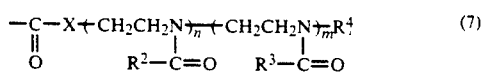 (7)

where $R^2$ represents H or a (substituted) alkyl or aryl group, $R^3$ represents H or a (substituted) alkyl or aryl group which is different from $R^2$, $R^4$ represents H or a (substituted) alkyl group, X represents O or $NR^5$, $R^5$ represents H or an alkyl or aryl group, each of n and m represents an integer of 1 to 1000, or by the general formula:

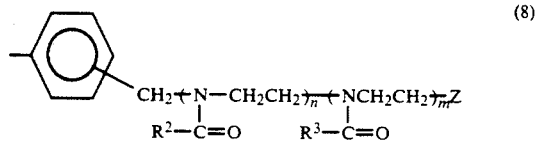 (8)

where $R^2$ represents H or a (substituted) alkyl or aryl group, $R^3$ represents H or a (substituted) alkyl or aryl group which is different from $R^2$, Z represents an electron attracting group such as OH, Br, I and $RSO_3$ and each of n and m represents an integer of 1 to 1000, as the graft chain can be obtained by copolymerizing an acrylic or styryl type macromonomer having such a novel amphiphilic polyethyleneimine derivative chain with a radical or anion copolymerizable monomer.

When producing such a novel graft polymer, the comonomer copolymerizable with the macromonomer represented by the general formulae (1) and (2) as described above, there can be used those monomers in combination, for example, styrenic compound such as styrene, vinyl toluene, δ-methyl styrene; acryl acid, methacrylic acid, acrylic acid or methacrylic acid derivative such as, methyl acrylate, ethyl acrylate, propyl acrylate, butyl acrylate, 2-ethyl-hexyl acrylate, methyl methacrylate, ethyl methacrylate, propyl methacrylate, butyl methacrylate, 2-ethylhexyl methacrylate, hydroxyethyl methacrylate, dimethylaminoethyl methacrylate, diethylaminoethyl methacrylate, acrylonitrile, methacrylonitrile, acrylamide and methacrylamide; ethylenically monoolefin such as ethylene, propylene and butylene; diolefin such as butadiene, isoprene, piperylene; vinyl halide such as vinyl chloride, vinylidene chloride, vinyl bromide and vinyl fluoride; vinyl ester such as vinyl acetate and vinyl propionate; vinyl ether such as methyl vinyl ether and ethyl vinyl ether; vinyl ketone such as vinyl methyl ketone and methyl isopropenyl ketone; nitrogen-containing vinyl compound such as nitroethylene, 2-vinylpyridine, 4-vinylpyridine and N-vinylpyrrolidone; sulfur-containing vinyl compound such as methyl vinyl sulfone; phosphor-containing vinyl compound such as vinyl sulfonic acid, diethyl vinyl phosphonate and vinyl phosphone amide alone or as a mixture of two or more of them. A novel polymer having a amphiphilic polyethylene imine derivative chain can be synthesized by copolymerizing the macromonomer according to the present invention and the comonomer as described above, or by graft polymerizing the comonomer to the polymer obtained by the polymerization of such as monomers.

When the macromonomer according to the present invention is copolymerized with other comonomer, there may be used a method of adding a solvent, as required, to the mixture of such monomers, and adding a radical polymerization initiator or anionic polymerization initiator, or irradiating light or radioactive rays.

The solvent used in this case varies depending on the structure of the substituent groups in the macromonomer in the present invention and the structure of the comonomer combined in the copolymerization, and an appropriate solvent can be selected for use such as acetonitrile, benzonitrile, nitromethane, toluene, tetrahydrofuran, t-butanol and water so long as they provide no troubles in the polymerizing reaction.

As the polymerization initiator used for polymerization, there can be mentioned, for example, known radical polymerization initiator such as usual radical generator, for example, benzoyl peroxide, azobisisobutyronitrile and a redox type radical generator, for example, hydrogen peroxide-iron system, as well as other known anionic polymerization initiator such as organic metal series, for example, butyllithium, butylmagnesium bromide.

There is no particular restriction on the temperature of such polymerization, but it is usually from 20° to 150° C. for radical polymerization and from −78° to 25° C. for anionic polymerization. Further, in the case of radiation-induced polymerization, it is usually from −20° to 50° C.

The acrylic or styryl type macromonomer according to the present invention has a surface activity by itself and functions also as an emulsifier. In addition, it can be copolymerizable with various kinds of comonomers, by which the amphiphilic polyethyleneimine derivative chain can be introduced into the polymer thereby enabling an increase in the softening point or glass transition point of the polymer to improve its thermal property. Further, the novel graft polymer, having the thus obtained amphiphilic polyethyleneimine derivative chain as the graft chain, is a polymeric material having special surface activity and it is a useful material that can be utilized for various application uses, such as for polymeric surface active agent, surface improving agent and adhesive and like other various application uses.

EXAMPLE 1

In a tubular glass polymerization reactor under an argon atmosphere, 0.623 g (7.33 mmol) of 2-methyl-2-oxazoline dissolved in 2 ml of acetonitrile was charged and kept at 0° C. Then, 0.369 g (1.98 mmol) of methyl p-toluenesulfonate dissolved in 1 ml of acetonitrile was added, thoroughly mixed and then reacted at 80° C. for 18 hours. Then, 1.18 g (9.31 mmol) of 2-n-butyl-2-oxazoline dissolved in 2 ml of acetonitrile was added and further reacted at 100° C. for 25 hours to obtain a reaction solution (I), to which 0.986 g (10.9 mmol) of acrylic acid and 0.241 g (2.38 mmol) of triethylamine were added and reacted at 80° C. for 12 hours. After the reaction was over, the resultant reaction solution was poured into ether under stirring to re-precipitate the product. Then after removing the supernatant, the residue was dried under a reduced pressure at room temperature to obtain 2.73 g (97% yield) of an amphiphilic acrylic macromonomer.

When the molecular weight was measured for the compound by VPO, it was 900. Further, MWD of the compound measured by GPC was 1.29.

EXAMPLE 2

In accordance with the procedures as those in Example 1, reaction and purification were conducted while varying the respective molar ratios for 2-methyl-2-oxazoline, 2-n-butyl-oxazoline, methyl p-toluenesulfonate, acrylic acid and triethylamine, to obtain 3.02 g (89% yield) of acrylic amphiphilic macromonomer.

When the molecular weight was measured for the compound by VPO, it was 830. Further, MWD of the compound measured by GPC was 1.30. Further, when the surface tension ($\gamma$) of an aqueous 1% solution of the compound was measured, it was 37.0 dyn/cm.

EXAMPLE 3

In the same procedures as those in Example 1 except for using 2-phenyl-2-oxazoline instead of 2-n-butyl-2-oxazoline in Example 1, 2.87 g (100% yield) of an amphiphilic acrylic macromonomer was obtained.

When the molecular weight was measured for the compound by VPO, it was 1680. Further, MWD of the compound measured by GPC was 1.16.

EXAMPLE 4

In the same procedures as those in Example 1 except for using 2-phenyl-2-oxazoline instead of 2-methyl-2-oxazoline in Example 1 and using 2-methyl-2-oxazoline instead of 2-n-butyl-2-oxazoline respectively, 2.65 g (100% yield) of an amphiphilic acrylic macromonomer was obtained.

When the molecular weight for the compound was measured by VPO, it was 1230. Further, MWD of the compound measured by GPC was 1.17.

EXAMPLE 5

In accordance with the procedures as those in Example 4, reaction and purification were conducted while varying the respective molar ratios for 2-phenyl-2-oxazoline, 2-methyl-2-oxazoline, methyl p-toluenesulfonate, acrylic acid and triethylamine, to obtain 4.59 g (100% yield) of an amphiphilic acrylic macromonomer.

When the molecular weight was measured for the compound by VPO, it was 2510. Further, MWD of the compound the measured by GPC was 1.17.

EXAMPLE 6

In a tubular glass polymerization reactor under an argon atmosphere, 0.74 g (8.69 mmol) of 2-methyl-2-oxazoline dissolved in 2 ml of acetonitrile was charged and kept at 0° C. Then, 0.44 g (2.38 mmol) of methyl p-toluenesulfonate dissolved in 1 ml of acetonitrile was added, thoroughly mixed and then reacted at 80° C. for 20 hours. Then, 1.42 g (11.2 mmol) of 2-n-butyl-2-oxazoline dissolved in 2 ml of acetonitrile was added and further reacted at 100° C. for 32 hours to obtain a reaction solution (I), to which 0.75 g (4.76 mmol) of calcium acrylate dissolved in 2 ml of acetonitrile was added and reacted at 60° C. for 8 hours. After filtering the reaction solution to remove the precipitate, the solution was poured into ether to re-precipitate the product. Then after removing the supernatant, the residue was dried under a reduced pressure at a room temperature to obtain 2.17 g (92% yield) of an amphiphilic acrylic macromonomer.

When the molecular weight was measured for the compound by VPO, it was 920. Further, MWD of the compound measured by GPC was 1.26.

EXAMPLE 7

In a tubular glass polymerization reactor under an argon atmosphere, 5.26 g (61.8 mmol) of 2-methyl-2-oxazoline dissolved in 5 ml of acetonitrile was charged and kept at 0° C. Then, 1.36 g (7.33 mmol) of methyl p-toluenesulfonate dissolved in 1 ml of acetonitrile was added, thoroughly mixed and then reacted at 80° C. for 16 hours. Then, 4.65 g (36.6 mmol) of 2-n-butyl-2-oxazoline dissolved in 5 ml of acetonitrile was added and further reacted at 100° C. for 30 hours to obtain a reaction solution (I), to which 1.81 g (21.0 mmol) of methacrylic acid and 0.589 g (5.82 mmol) of triethylamine was added and reacted at 80° C. for 15 hours. After the reaction was over, the resultant reaction solution was added under stirring to ether to re-precipitate the resultant product and, after removing the supernatant, the residue was dried under a reduced pressure at a room temperature to obtain 9.35 g (80% yield) of an amphiphilic methacrylic macromonomer.

When the molecular weight was measured for the compound by VPO, it was 1200. Further, MWD of the compound the measured by GPC was 2.90.

Further, when the surface tension of the compound in an 1% aqueous solution was measured, it was 33.5 dyn/cm.

EXAMPLE 8

In a tubular glass polymerization reactor under an argon atmosphere, 0.868 g (10.2 mmol) of 2-methyl-2-oxazoline dissolved in 2 ml of acetonitrile was charged and kept at 0° C. Then, 0.244 g (1.00 mmol) of iodomethylstyrene dissolved in 1 ml of acetonitrile was added, thoroughly mixed and then reacted at 80° C. for 24 hours. Then, 0.636 g (5.00 mmol) of 2-n-butyl-2-oxazoline dissolved in 2 ml of acetonitrile was added and further reacted at 100° C. for 24 hours to obtain a reaction solution (I). After the reaction was over, the resultant reaction solution was added under stirring to ether to re-precipitate the resultant product. After removing the supernatant, the residue was dried under a reduced pressure at a room temperature to obtain 1.71 g (98% yield) of an amphiphilic styryl macromonomer.

When the molecular weight was measured for the compound by VPO, it was 1580. Further, MWD of the compound measured by GPC was 1.25.

EXAMPLE 9

Reaction was conducted in the same procedures as in Example 8 except for using 2-tridecyl-2-oxazoline instead of 2-n-butyl-2-oxazoline in Example 8 and the resultant reaction solution was evaporated to dryness to obtain 1.87 g (94% yield) of amphiphilic styryl macromonomer.

When the molecular weight was measured for the compound by VPO, it was 1790. Further, MWD of the compound measured by GPC was 1.14.

EXAMPLE 10

In the same procedures as those in Example 1 except for using 2-n-butyl-2-oxazoline instead of 2-methyl-2-oxazoline in Example 8 and using 2-methyl-2-oxazoline instead of 2-n-butyl-2-oxazoline respectively, 1.75 g (94% yield) of an amphiphilic styryl macromonomer was obtained.

When the molecular weight was measured for the compound by VPO, it was 1130. Further, MWD of the compound measured by GPC was 1.23.

EXAMPLE 11

Reaction was conducted in the same procedures as those in Example 8 except for using 2-tridecyl-2-oxazoline instead of 2-methyl-2-oxazoline in Example 8 and using 2-methyl-2-oxazoline instead of 2-n-butyl-2-oxazoline respectively, and the resultant reaction solution was evaporated to dryness, to obtain 1.60 g (99% yield) of an amphiphilic styryl macromonomer.

When the molecular weight was measured for the compound by VPO, it was 1530. Further, MWD of the compound measured by GPC was 1.18.

EXAMPLE 12

In an argon atmosphere, 0.05 g (0.05 mmol) of the amphiphilic acrylic macromonomer obtained in Example 1 and 0.51 g (4.90 mmol) of styrene were charged in a polymerization reactor, to which 1.0 ml of acetonitrile and 0.017 g (0.10 mmol) of azobisisobutyronitrile (AIBN) were added, the polymerization vessel was sealed by using a rubber baloon filled with an argon gas and they were reacted at 80° C. for 6 hours. After reaction, they were cooled to a room temperature, and dropped into diethyl ether with addition of a small amount of chloroform to re-precipitate a reaction product. Then, the polymer was isolated by suction filtration using a glass filter, dried under a reduced pressure at a room temperature to obtain 0.37 g (67% yield, based on the total amount of charged monomer) of white solid copolymer.

In this case since it was confirmed that all the vinyl groups in the macromonomer and styrene were completely consumed, from $^1$H-NMR data measured just after the completion of the reaction, it is considered that loss of yield was caused in the purification step of the polymer due to re-precipitation.

When the resultant copolymer was analyzed by GPC using chloroform as a solvent, a molecular weight distribution curve having a broad peak was obtained to find that a homopolymer composed only of the macromonomer was not present. The molecular weight (Mn) was 26,000.

EXAMPLE 13

Copolymerizing reaction was conducted by the same procedures as those in Example 12 except for using 0.09 g (0.05 mmol) of the amphiphilic styryl macromonomer obtained in Example 8 and 0.51 g (5.10 mmol) of methyl methacrylate. The reaction was continued for 4 hours and by the same treatment as in Example 12, 0.38 g (63% yield based on the total amount of the charged monomer) of white solid polymer was obtained.

When the resultant copolymer was analyzed in the same manner by GPC, a molecular weight distribution curve having a broad peak was obtained. The molecular weight (Mn) was 24,000.

The acrylic or styryl macromonomer having an amphiphilic polyethyleneimine derivative chain is useful as an emulsifying monomer in the soap-free emulsion polymerization and, since it has an acrylic or α-substituted acrylic and styryl polymerizable functional group at the terminal end, it is also useful for the synthesis of novel polymers by copolymerization with various monomers or graft polymerization to various polymers. The novel graft polymers produced by using such novel amphiphilic macromonomer have a specific surface activity which can be expected for various application uses.

What is claimed is:

1. A (meth)acrylic macromonomer having an amphiphilic polyethyleneimine derivative chain represented by the general formula:

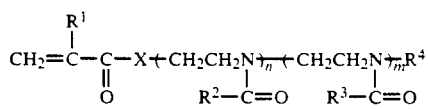

where $R^1$ represents H or $CH_3$, $R^2$ represents H or a (substituted) alkyl or aryl group, $R^3$ represents H or a (substituted) alkyl or aryl group which is different from $R^2$, $R^4$ represents H or a (substituted) alkyl group, X represents O or $NR^5$, $R^5$ represents H or an alkyl or aryl group and each of n and m represents an integer of 1 to 1000.

* * * * *